United States Patent
Zhang et al.

(10) Patent No.: US 12,423,786 B2
(45) Date of Patent: Sep. 23, 2025

(54) MULTI-SCALE FUSION DEFOGGING METHOD BASED ON STACKED HOURGLASS NETWORK

(71) Applicant: NANJING UNIVERSITY OF POSTS AND TELECOMMUNICATIONS, Nanjing (CN)

(72) Inventors: Dengyin Zhang, Nanjing (CN); Qian Zhao, Nanjing (CN); Jingyu Wang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 349 days.

(21) Appl. No.: 18/312,168

(22) Filed: May 4, 2023

(65) Prior Publication Data
US 2024/0062347 A1    Feb. 22, 2024

Related U.S. Application Data

(63) Continuation of application No. PCT/CN2023/086215, filed on Apr. 4, 2023.

(30) Foreign Application Priority Data

Aug. 22, 2022   (CN) .......................... 202211007029.3

(51) Int. Cl.
*G06T 5/80*      (2024.01)
*G06T 3/40*      (2024.01)

(52) U.S. Cl.
CPC .................. *G06T 5/80* (2024.01); *G06T 3/40* (2013.01); *G06T 2207/20016* (2013.01); *G06T 2207/20084* (2013.01)

(58) Field of Classification Search
CPC .......................... G06T 5/80; G06T 3/40; G06T 2207/20016; G06T 2207/20084; G06T 5/60; G06T 5/73; G06N 3/045; G06N 3/0464
See application file for complete search history.

(56) References Cited

U.S. PATENT DOCUMENTS

2023/0351573 A1*  11/2023  Zhang .................... B63B 35/00

FOREIGN PATENT DOCUMENTS

| CN | 107025636 A | 8/2017 |
| CN | 107424133 A | 12/2017 |
| CN | 115019395 A | 9/2022 |

OTHER PUBLICATIONS

CN110570371 Li et al, 2019, machine translated (Year: 2019).*
Stacked Hourglass Networks, Newell et al 2016 (Year: 2016).*

* cited by examiner

*Primary Examiner* — Jianxun Yang
(74) *Attorney, Agent, or Firm* — Nitin Kaushik

(57) ABSTRACT

Disclosed is a multi-scale fusion defogging method based on a stacked hourglass network, including inputting a foggy image into a preset image defogging network; and outputting a fogless image after the foggy image is processed by the image defogging network. The image defogging network includes a 7×7 convolutional layer, a stacked hourglass module, a feature fusion, a multi-scale jump connection module, a 1×1 convolutional layer, a 3×3 convolutional layer, a hierarchical attention distillation module, the 3×3 convolutional layer and the 1×1 convolutional layer connected sequentially.

5 Claims, 9 Drawing Sheets

MULTI-SCALE FUSION DEFOGGING METHOD BASED ON STACKED HOURGLASS NETWORK

CROSS-REFERENCE TO RELATED APPLICATIONS

This application is a continuation application of International Application No. PCT/CN2023/086215, filed on Apr. 4, 2023, which claims priority to Chinese Patent Application No. 202211007029.3, filed on Aug. 22, 2022. The disclosures of the above-mentioned applications are incorporated herein by reference in their entireties.

TECHNICAL FIELD

The present application relates to a multi-scale fusion defogging method based on a stacked hourglass network, which belongs to the field of image processing technology.

BACKGROUND

Vision is the most intuitive way for humans to obtain information, and with the development of artificial intelligence, a computer vision is widely used in various fields of our life. However, due to the problem of atmospheric pollution, the clarity of the collected photos will be affected, with the characteristics of reduced contrast, blurred images and serious deficiency of extractable features. However, the image video is the main source for people to obtain information, its quality seriously affects the reading and judgment of information, and high-level image processing also has high requirements for the quality of input images. Therefore, it is of high theoretical significance and application value to study the principle and method of high quality, fast and universal defogging.

The purpose of image defogging is to eliminate the influence of the foggy environment on the image quality and increase the visibility of the image, which can be achieved by three methods, the first method is based on image enhancement algorithms, i.e., to enhance the degraded image, improve the image quality, and highlight the features and valuable information of the scenery in the image, but this method does not consider the causes that lead to image degradation, and the processing may lead to the loss of some information in the image and distortion. The second method is based on atmospheric degradation model, that is, using the a priori knowledge of fogless images to estimate the parameters in the model, and then substituting the parameters into the model and then recovering the fogless images. The fogless images obtained by the second method are clearer and mom natural with less detail loss, but there are limitations of different priori knowledge for their respective application scenarios. The third method is based on deep learning. i.e., estimating the transmittance from the training data set or using the input foggy image and directly outputting the defogging image. The latest defogging method currently prefers the third method, but the third method has limitations such as low defogging efficiency and poor quality due to the need to estimate parameters and the large number of estimated parameters and insufficient richness of features.

SUMMARY

In order to overcome the deficiencies in the related art, the present application provides a multi-scale fusion defogging method based on a stacked hourglass network, which accomplishes the learning task by constructing and combining multiple networks. The stacked hourglass network is first used to extract features, and then the multi-scale module is used to fuse features to obtain significantly superior generalization performance than a single network. During network optimization, a two-layer attention module is used to improve the convolutional feature representation of the mobile network.

In order to achieve the above technical problems, the present application provides a multi-scale fusion defogging method based on a stacked hourglass network, including:
  inputting a foggy image into a preset image defogging network; and
  outputting a fogless image after the foggy image is processed by the image defogging network;
  where the image defogging network includes a 7×7 convolutional layer, a stacked hourglass module, a feature fusion, a multi-scale jump connection module, a 1×1 convolutional layer, a 3×3 convolutional layer, a hierarchical attention distillation module, the 3×3 convolutional layer and the 1×1 convolutional layer connected sequentially.

In an embodiment, the stacked hourglass module consists of N fourth-stage hourglass modules in series;
  each fourth-stage hourglass module includes five parallel convolutional streams, where an innermost convolutional stream is configured to process an original scale, a second to last convolutional stream and an outermost convolutional stream are configured to downsample to $\frac{1}{2}$, $\frac{1}{4}$, $\frac{1}{8}$ and $\frac{1}{16}$, respectively; and
  the five parallel convolutional streams are configured to extract features in different resolution groups, and deliver the features of each resolution through a residual module, to be recovered to the original scale through an up sample layer and be fused after recovery.

In an embodiment, the fourth-stage hourglass module is formed by replacing a residual module at a middle of a fourth row of a third-stage hourglass module with a first-stage hourglass module;
  the third-stage hourglass module is formed by replacing a residual module at a middle of a third row of a second-stage hourglass module with the first-stage hourglass module;
  the second-stage hourglass module is formed by replacing a residual module at a middle of a second row of the first-stage hourglass module with the first-stage hourglass module; and
  the first-stage hourglass module include a first row including a residual module and a second row including a max pool layer, three residual modules and the up sample layer in sequence, where the first row and the second row of the first-stage hourglass module are configured to fuse and output the features.

In an embodiment, each residual module consists of a first row being a skip level layer including the 1×1 convolutional layer, and a second row being a convolutional layer that includes a batch normalization (BN) layer, a rectified linear unit (Relu) layer, the 1×1 convolutional layer, the BN layer, the Relu layer, the 3×3 convolutional layer, the BN layer, the Relu layer and the 1×1 convolutional layer; and
  fusing and outputting the features at outputs of the skip level layer and the convolutional layer.

In an embodiment, the N is 8.

In an embodiment, the multi-scale jump connection module includes a first row consisting of three 3×3 convolutional layers and a Relu layer in series, a second row consisting of three 5×5 convolutional layers and the Relu layer in series, and a third row consisting of three 7×7 convolutional layers and the Relu layer in series;

taking outputs of a first 3×3 convolutional layer and the Relu layer of each row as inputs of a second 3×3 convolutional layer and the Relu layer of each row, respectively;

taking outputs of the second 3×3 convolutional layer and the Relu layer of each row as inputs of a third 3×3 convolutional layer and the Relu layer of each row, respectively; and fusing outputs of the third 3×3 convolutional layer and the Relu layer of each row through a contact module and outputting after fusion.

In an embodiment, the hierarchical attention distillation module includes a channel attention module and a spatial attention module, and fusing outputs of the channel attention module and the spatial attention module and outputting after fusion.

In an embodiment, the method further includes:

processing, by the channel attention module, an input feature map F through a global max pool layer in H dimension and a global avgpool layer in W dimension respectively, to obtain two 1×1×C feature maps, where the input feature map F is expressed by a formula F=H×W×C, H denotes height, W denotes width, C denotes a number of channels; and inputting the two 1×1×C feature maps into a two-layer neural network with shared weights for learning inter-channel dependencies; and summing and fusing features output from a multilayer perceptron (MLP); and operating by a sigmoid function after fusion to generate a weight M of channels.

In an embodiment, the method further includes:

processing, by the spatial attention module, an input feature map F through a max pool layer in C dimension and an avgpool layer in C dimension respectively, to obtain two H×W×1 feature maps, where the input feature map F is expressed by a formula F=H×W×C, H denotes height, W denotes width, C denotes a number of channels;

splicing the two H×W×1 feature maps based on a channel dimension;

reducing the channel dimension on the spliced feature map by using the 7×7 convolution layer; and operating by a sigmoid function after fusion to generate a weight M of a spatial dimension.

Beneficial effects: the present application provides a multi-scale fusion defogging method based on a stacked hourglass network to solve the problems, which are existed in the existing existing image defogging method that uses deep learning, that low defogging efficiency and poor quality are caused by the need to estimate parameters and the large number of estimated parameters and insufficient richness of features.

The present application belongs to end-to-end defogging, a foggy image is input into the above network, and the fogless image can be output directly. Due to the use of stacked hourglass module and the multi-scale jump connection module, it can solve the problem that the existing neural network cannot effectively capture local and global features simultaneously; the hierarchical attention distillation module is introduced to optimize the network structure, with retaining spatial and contextual information and extracting more useful hierarchical features. It is able to make significant progress in fully utilizing multi-scale defogging features and recovering structural details to improve the quality of generated images.

The present application first captures features repeatedly at various scales by using the stacked hourglass network from bottom to top and top to bottom, then repeatedly fuses the information by using the multi-scale jump connection method, and finally combines a two-layer attention mechanism to avoid features from disappearance and remove unnecessary features, to achieve comprehensive feature aggregation and improve the defogging performance. The present application can be applied to various computer vision systems, such as image recognition, video surveillance, industrial vision inspection, etc., which can reduce a large amount of labor costs and significantly improve image quality and service efficiency, to ensure better customer service and make the final defogging results to meet the requirements of high-level image processing and human vision.

DETAILED DESCRIPTION OF THE EMBODIMENTS

The present application is further described below in conjunction with specific embodiments.

Figure 1:
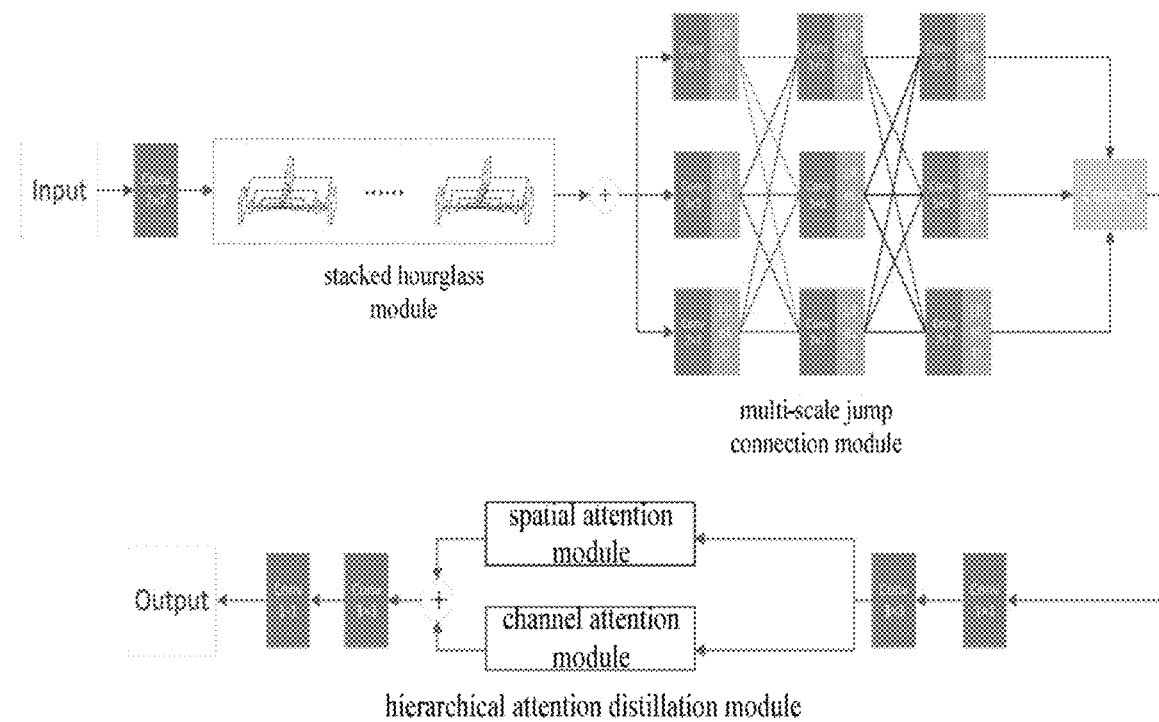
FIG. 1 is an overall flowchart of a method according to an embodiment of the present application.

As shown in FIG. 1, the present application discloses a multi-scale fusion defogging method based on a stacked hourglass network, when a foggy image is input into the image defogging network and a fogless image is directly output after defogging.

The image defogging network is a 7×7 convolutional layer, a stacked hourglass module, a feature fusion, a multi-scale jump connection module, a 1×1 convolutional layer, a 3×3 convolutional layer, a hierarchical attention distillation module, the 3×3 convolutional layer and the 1×1 convolutional layer connected sequentially.

The 7×7 convolutional layer is used to process an original foggy image in the first step to form an initial feature image. The feature fusion is a summation operation for a sum of features. The 1×1 convolutional layer following the multi-scale jump connection module is used to adjust the number of channels, that is, to adjust the number of changed channels after processing by a contact module, and obtain low-frequency feature information. The 3×3 convolutional layer following the multi-scale jump connection module is used to obtain high-frequency feature information. The 3×3 convolutional layers and the 1xi convolutional layers following the hierarchical attention distillation module are used to achieve feature modifications or auxiliary effects.

The stacked hourglass module consists of N fourth-stage hourglass modules in series, and when N is 4, 6, 8 and 10 in the present application, a corresponding peak signal-to-noise ratio (PSNR) is 27.28, 27.96, 28.35 and 28.37, and a structural similarity (SSIM) is 0.9122, 0.9180, 0.9217 and 0.9214. Two metrics are the larger the better, but N varies from 4 to 8, the changes on the two metrics are obvious, and when N varies from 8 to 10, the PSNR rises insignificantly and the SSIM decreases, therefore, 8 is an optimal value in the present application.

Figure 2:
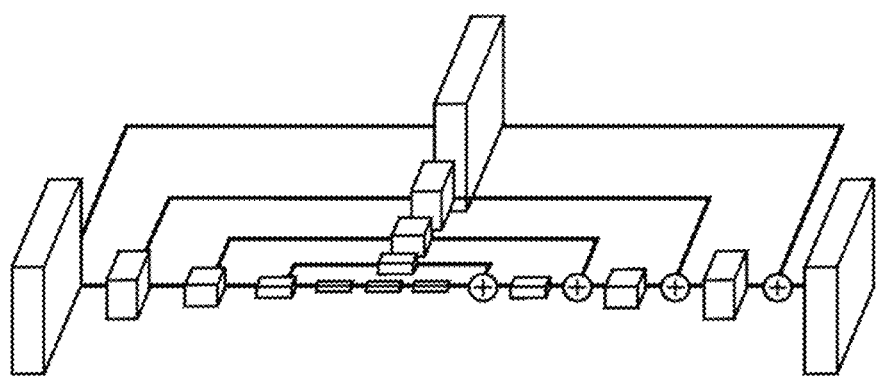
FIG. 2 is a schematic diagram of a network architecture of a sampling rule of a fourth-stage hourglass module.

As shown in FIG. 2, the fourth-stage hourglass module integrates closely connected residual block modules, a max pool layer, an up sample layer and a residual fusion through a parallel structure to form a symmetric topology, where each scale has a layer from top to bottom and a layer from bottom to top, to extract features from top to bottom and from bottom to top repeatedly. The size of the block indicates the size of the feature map, the small block indicates downsampling, the large block indicates upsampling, and "+" indicates a summation of elements.

The specific process is as follows: the fourth-stage hourglass module includes five parallel convolutional streams. An innermost convolutional stream processes an original scale, and a second to last convolutional stream and an outermost convolutional stream are configured to downsample to ½, ¼, ⅛ and 1/16 respectively, and the five parallel convolutional streams are configured to extract features in different resolution groups, and then deliver the features of each resolution through the residual module, to finally be recovered to the original scale through the up sample layer and be fused after recovery, i.e., the features of different resolutions are summed by element positions, so that feature information can be extracted and retained at multiple scales, to achieve the effect of retaining both local features and global features.

Figure 3:
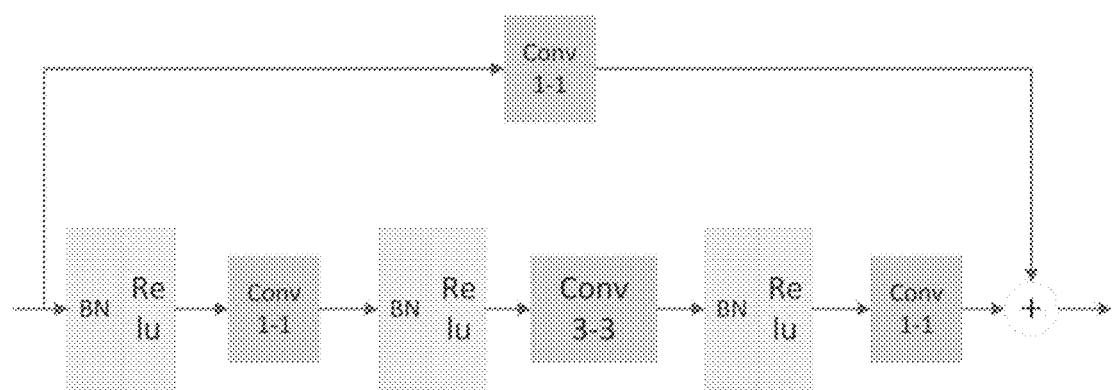
FIG. 3 is a schematic diagram of a network architecture of a residual module.

The residual module is a basic component unit of the first-stage hourglass module, and the specific network architecture is shown in FIG. 3. The residual module consists of two rows which are a first row being a skip level layer that includes a 1×1 convolutional layer (Conv) for retaining the original hierarchical information, and a second row being a convolutional layer for extracting features which includes a batch normalization (BN) layer, a rectified linear unit (Relu) layer, the >1 convolutional layer, the BN layer, the Relu layer, the 3×3 convolutional layer, the BN layer, the Relu layer and the 1×1 convolutional layer in sequence. Features are fused at the output of the skip level layer and the output of the convolutional layer and then output after fusion.

In the second row of convolutional layers, the signal is normalized first by the BN layer, and then passes through the Relu layer to make the main path more nonlinear, and then passes through the 1×1 convolutional layer to reduce dimensions because after a reduction of the dimensions, the data training and the feature extraction can be performed more efficiently and intuitively, and then passes through the BN layer and the Relu layer again, and then passes through the 3×3 convolutional layer for relatively low-dimensional computation to improve the network depth and efficiency, and then passes through the BN layer and the Relu layer for the third time, and then passes through the 1×1 convolutional layer for improving dimensions, and finally together with the skip level layer for feature fusion, which does not change the data size but only increases the data depth.

Figure 4:
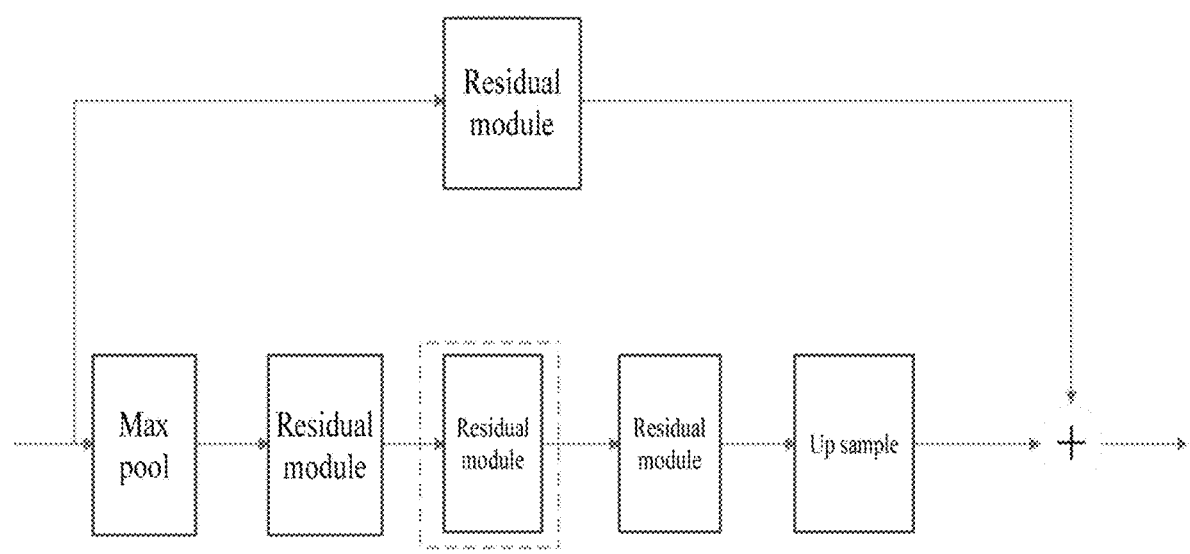
FIG. 4 is a schematic diagram of a network architecture of a first-stage hourglass module.

The first-stage hourglass module consists of two rows, its specific network architecture is shown in FIG. 4. The first row includes only one residual module, the second row consists of a max pool layer, three residual modules and an up sample layer in sequence. The max pool layer is used for downsampling the feature map to obtain a lower resolution feature map and reduce the computational complexity, three residual modules and the up sample layer are configured for upsampling the feature map by using the nearest neighbor interpolation method to improve the resolution of the feature of the image, to keep the size be the same as the input image. The first row and the second row are used for feature fusion and then fused features are output, so that the output results include features of the original resolution and the features whose resolution is reduced to ½ after downsampling.

Figure 5:
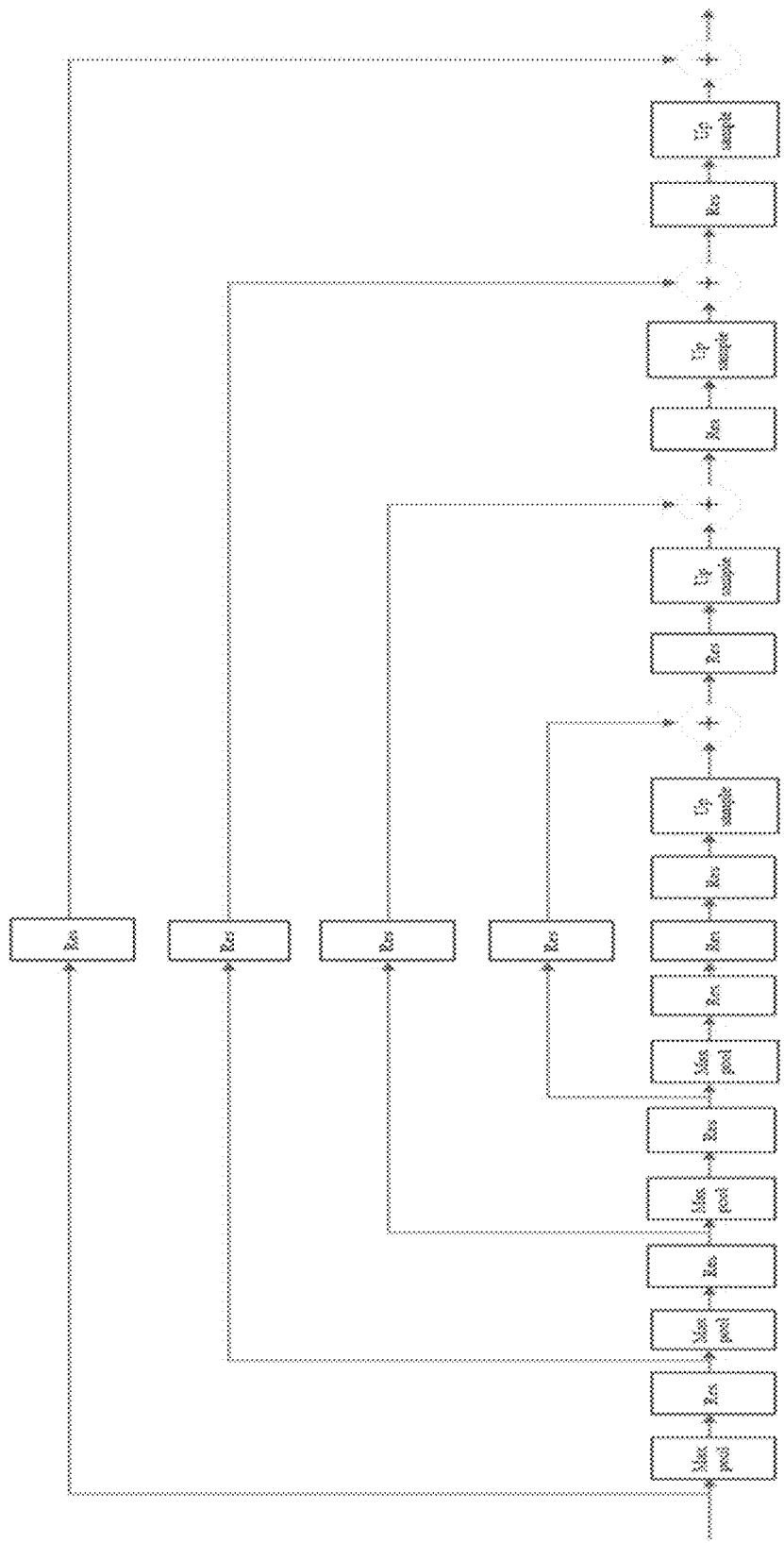
FIG. 5 is a schematic diagram of a network architecture of a fourth-stage hourglass module.

The second-stage hourglass module is formed by replacing the residual module at the middle of the second row of the first-stage hourglass module with the first-stage hourglass module, the third-stage hourglass module is formed by replacing the residual module at the middle of the third row of the second-stage hourglass module with the first-stage hourglass module, the fourth-stage hourglass module is formed by replacing the residual module at the middle of the fourth row of the third-stage hourglass module with the first-stage hourglass module, and so on, to form a recursive structure as shown in FIG. 5.

Figure 6:
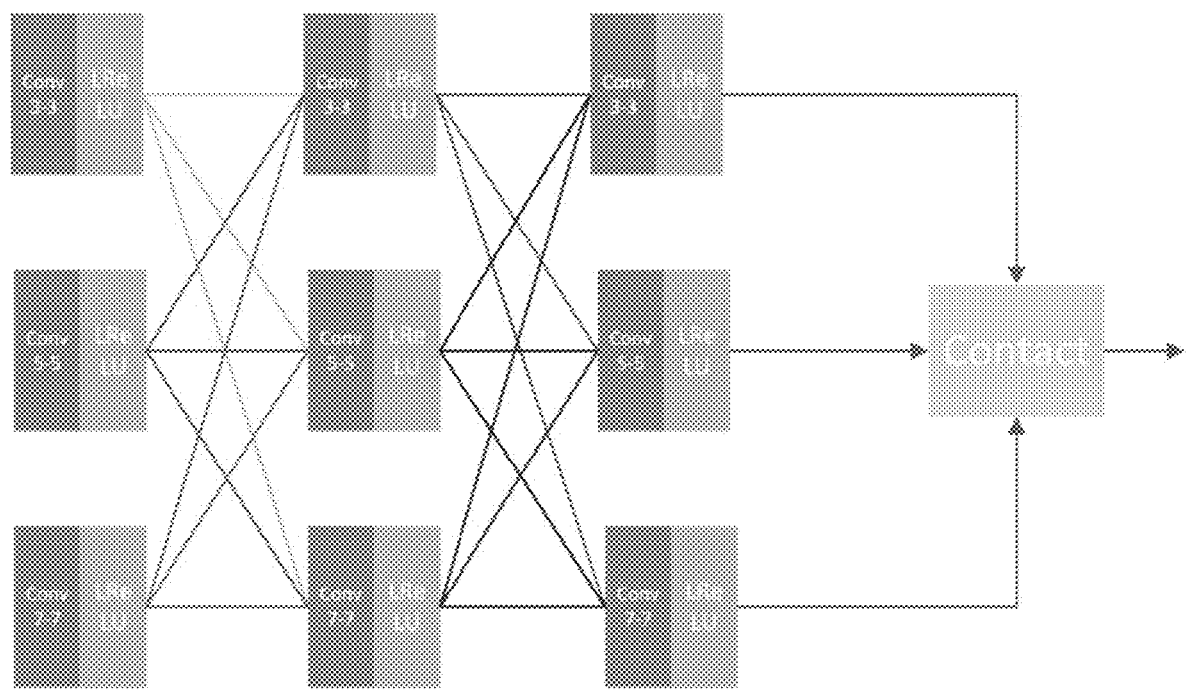
FIG. 6 is a schematic diagram of a network architecture of a multi-scale jump connection module.

As shown in FIG. 6, the multi-scale jump connection module includes three convolutional operations of different sizes of convolutional kernels and activation functions, the first row consists of three 3×3 convolutional layers and the Relu layer in series, the second row consists of three 5×5 convolutional layers and the Relu layer in series, and the third row consists of three 7-7 convolutional layers and the Relu layer in series. The outputs of the first 3×3 convolutional layer and the Relu layer of each row are used as the inputs of the second 3×3 convolutional layer and the Relu layer of each row respectively, and the outputs of the second 3×3 convolutional layer and the Relu layer of each row are used as the inputs of the third 3×3 convolutional layer and the Relu layer of each row respectively, and the outputs of the third 3×3 convolutional layer and the Relu layer of each row are fused by the contact module.

The convolution kernels of different sizes are used to enable extraction at different feature scales to obtain deep detail information. In addition, in order to ensure that the size of the convolved feature map and the original foggy map do not change, the convolution operations thereof use zero filling. The activation function is introduced after the convolution operation to do nonlinear operations on the output results of the convolution layer, so that the convolutional neural network gains the ability to solve complex problems, and the robustness of the convolutional neural network to nonlinear factors is improved. In choosing the activation function, the Leaky ReLU is used, the function image of the Leaky ReLU is linear in the segment interval and nonlinear as a whole, and the value domain is the set of whole real numbers, which can improve the network convergence speed.

However, there is an innovation in the connection method of the present application, it is not simply doing parallel convolutional operations with three groups of convolutional kernels of different sizes, but using a jump connection method to output the output results of the previous 3×3 convolutional and the Relu layer in this row to the next 3×3 convolutional and the Relu layer in the other two rows and the next 3×3 convolutional and the Relu layer in series, so that the inputs of the next 3×3 convolutional layer and the Relu layer of each row are a summation of the outputs of the previous 3×3 convolutional layer and the Relu layer with different sizes of convolutional kernels respectively to achieve multi-scale information fusion.

Three feature maps are obtained after each row of convolutional kernel operation, and the three feature maps output from the third 3×3 convolutional layer and the Relu layer are fused by the contact module, i.e., the number of channels of the three feature maps are added, while the information of each channel is not added to increase the number of channels to combine the features obtained previously and retain the features extracted from different scales of convolutional kernels to achieve better performance.

The output of each convolution following the multi-scale jump connection module is as follow:

$F_2^{n \times n}$ is an output of the first convolutional layer with a convolutional size n×n, which can be expressed as $$F_a^{3\times3}=Conv_{3\times3}(F_{in};\theta_a^{3\times3});$$

$$F_a^{5\times5}=Conv_{5\times5}(F_{in};\theta_a^{5\times5});$$

$$F_a^{7\times7}=Conv_{7\times7}(F_{in};\theta_a^{7\times7});$$

Where $F_{in}$ is an input of an original image of the multi-scale jump connection module, $Conv_{n \times n}(\cdot)$ is a convolution operation, and $\theta_a^{n \times n}$ denotes the hyperparameter formed by the first multi-scale convolution with a convolution kernel whose size is n×n.

$F_b^{n \times n}$ is an output of the second convolutional layer with a convolutional size n×n, which can be expressed as $$F_c^{3\times3}=Conv_{3\times3}((F_b^{3\times3}+F_b^{5\times5}+F_b^{7\times7});\theta_c^{3\times3});$$

$$F_c^{5\times5}=Conv_{5\times5}((F_b^{3\times3}+F_b^{5\times5}+F_b^{7\times7});\theta_c^{5\times5});$$

$$F_c^{7\times7}=Conv_{7\times7}((F_b^{3\times3}+F_b^{5\times5}+F_b^{7\times7});\theta_c^{7\times7});$$

Figure 7:
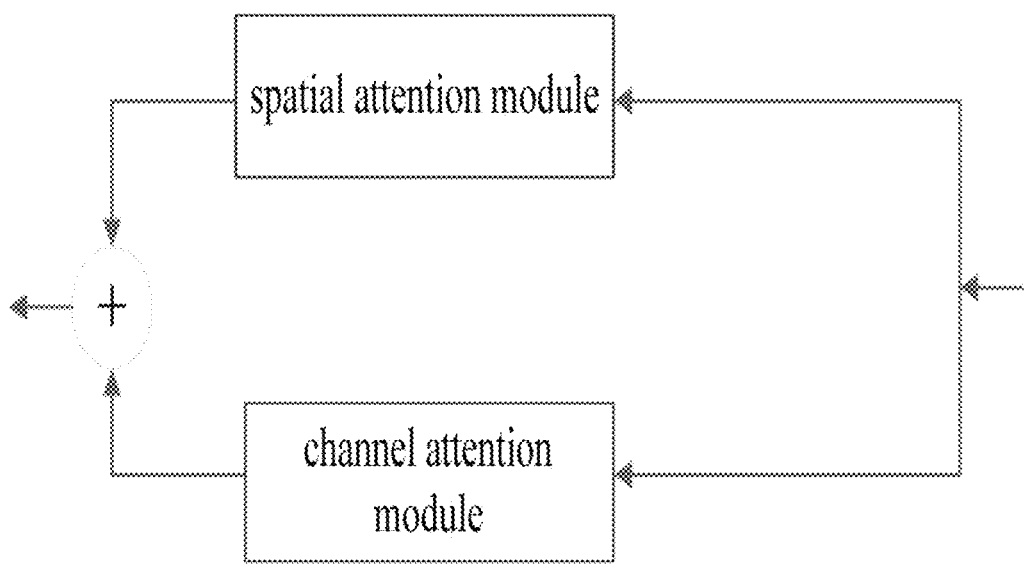
FIG. 7 is a schematic diagram of a network architecture of a hierarchical attention distillation module.

For the defogging problem, the key is to make full use of the foggy features and transfer them for defogging. As the depth of the network increases, the spatial expressiveness gradually decreases during transmission and a large number of redundant features are produced without purpose, which directly affects the quality of defogging. The hierarchical attention distillation module consists of a spatial attention module and a channel attention module in parallel, and its structure is shown in FIG. 7. The dual attention units are used to learn the importance of space and the importance of channel respectively, the output results are added, both space and contextual information are retained, and unnecessary features are reduced by using hierarchical attention fusion, only information features are allowed to be further transmitted, redundant features are eliminated, and the feature distillation is achieved, thus it is easily embedded in the framework.

Figure 8:
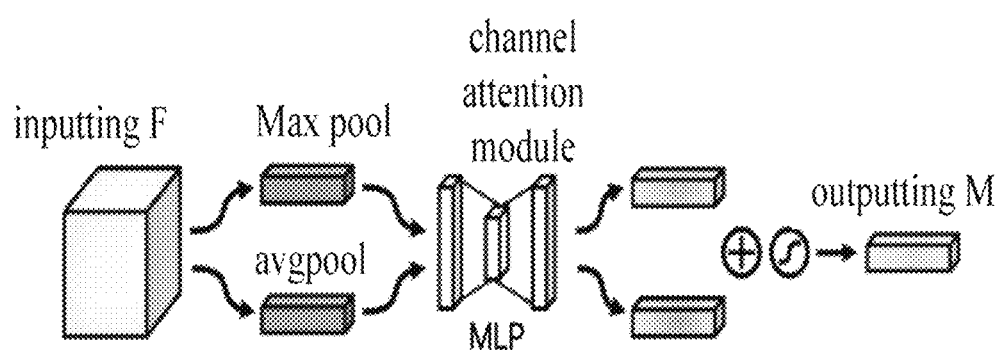
FIG. 8 is a flowchart of a channel attention module.

The structure of the channel attention module is shown in FIG. 8, its specific operation are as follows: first, the input feature map F (F=H×W×C, H denotes height, W denotes width, and C denotes number of channels) is processed through a global max pool layer and a global avgpool layer based on the two dimensions of H and W, respectively, to obtain two 1×1×C feature maps; then the two feature maps are input into two layers of the MLP with shared weights for learning inter-channel dependencies, and a reduction of the dimensions is achieved between the two neural layers by a compression ratio r. Finally, the features output from the MLP are summed and fused, and then subjected to a sigmoid function to generate the final weight M of the channels, to obtain the relationship between feature contextual information and hierarchical features.

The channel attention module is calculated as:

$$M(F)=\sigma(MLP(\text{AvgPool}(F))+MLP(\text{MaxPool}(F))),$$

where σ denotes a sigmoid.

Figure 9:
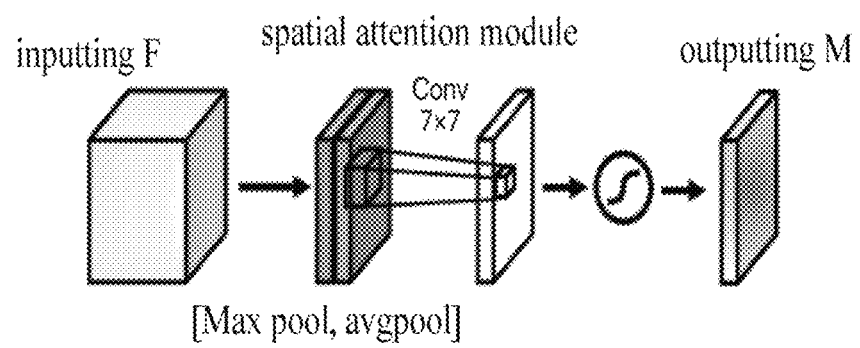
FIG. 9 is a flowchart of a spatial attention module.

The structure of the spatial attention module is shown in FIG. 9, its specific operation is as follows: first, the input feature map F (F=H×W×C, H denotes height. W denotes width, and C denotes number of channels) is processed through the max pool layer and the avgpool layer based on the C dimension, respectively, to obtain two H×W×1 feature maps, then the two H×W×1 feature maps are spliced based on the channel dimension, and the channel dimension on the spliced feature map is then reduced by using the 7×7 convolution layer and then operated by the sigmoid function to generate the weight M of spatial dimension, to learn the dependency relationship between different spatial elements.

The spatial attention module is calculated as:

$$M(F)=\sigma(f^{7\times7}([\text{AvgPool}(F);\text{MaxPool}(F)])),$$

where σ denotes the sigmoid and $f^{7\times7}$ denotes 7×7 convolutional layers.

The present application discloses a multi-scale fusion defogging method based on stacked hourglass networks in the field of image processing. The method generates a heat map by using a stacked hourglass network to extract features at different scales, then a new multi-scale fusion defogging module is constructed by using a jump connection method, and finally a hierarchical distillation structure with an attention mechanism is added to remove redundant information to obtain the fogless image.

The present application aims to solve a problem that the existing neural network cannot effectively capture both local and global features. Although the existing model has a great progress in the defogging effect, but still has insufficiency in making full use of multi-scale fogless features and recovering structural details, and few attempts to preserve spatial features and eliminate redundant information. However, the hourglass network in the present application has multiple parallel prediction branches, which are stacked and then combined with the multi-scale fusion module, and finally useless features are reduced through a hierarchical distillation structure, thus it can better mix the global information and the local information with high flexibility, and its induced spatial continuity has better analysis ability for dense foggy images and real scenes, and can also perform well in describing complex structures, and retains texture details as completely as possible, to largely improve the quality of image defogging and makes the visual effect of defogging more realistic and natural, and effectively improve the network performance.

The above is only an implementation of the present application, and it should be noted that several improvements and embellishments can be made by those skilled in the art without departing from the principle of the present application, and these improvements and embellishments should also be within the scope of the present application.

What is claimed is:

1. A multi-scale fusion defogging method based on a stacked hourglass network, comprising:
   inputting a foggy image into a preset image defogging network; and
   outputting a fogless image after the foggy image is processed by the image defogging network;
   wherein the image defogging network comprises a 7×7 convolutional layer, a stacked hourglass module, a feature fusion, a multi-scale jump connection module, a 1×1 convolutional layer, a 3×3 convolutional layer, a hierarchical attention distillation module, the 3×3 convolutional layer and the 1×1 convolutional layer connected sequentially;
wherein the stacked hourglass module consists of N fourth-stage hourglass modules in series;
each fourth-stage hourglass module comprises five parallel convolutional streams, wherein an innermost convolutional stream is configured to process an original scale, a second to last convolutional stream and an outermost convolutional stream are configured to downsample to ½, ¼, ⅛ and 1/16, respectively; and
the five parallel convolutional streams are configured to extract features in different resolution groups, and deliver the features of each resolution through a residual module, to be recovered to the original scale through an up sample layer and be fused after recovery;
wherein the fourth-stage hourglass module is formed by replacing a residual module at a middle of a fourth row of a third-stage hourglass module with a first-stage hourglass module;
the third-stage hourglass module is formed by replacing a residual module at a middle of a third row of a second-stage hourglass module with the first-stage hourglass module;
the second-stage hourglass module is formed by replacing a residual module at a middle of a second row of the first-stage hourglass module with the first-stage hourglass module; and
the first-stage hourglass module comprises a first row comprising a residual module and a second row comprising a max pool layer, three residual modules and the up sample layer in sequence, wherein the first row and the second row of the first-stage hourglass module are configured to fuse and output the features;
wherein each residual module consists of a first row being a skip level layer comprising the 1×1 convolutional layer, and a second row being a convolutional layer that comprises a batch normalization (BN) layer, a rectified linear unit (Relu) layer, the 1×1 convolutional layer, the BN layer, the Relu layer, the 3×3 convolutional layer, the BN layer, the Relu layer and the 1×1 convolutional layer; and
fusing and outputting the features at outputs of the skip level layer and the convolutional layer.

2. The multi-scale fusion defogging method according to claim 1, wherein the N is 8.

3. A multi-scale fusion defogging method based on a stacked hourglass network, comprising:
inputting a foggy image into a preset image defogging network; and
outputting a fogless image after the foggy image is processed by the image defogging network;
wherein the image defogging network comprises a 7×7 convolutional layer, a stacked hourglass module, a feature fusion, a multi-scale jump connection module, a 1×1 convolutional layer, a 3×3 convolutional layer, a hierarchical attention distillation module, the 3×3 convolutional layer and the 1×1 convolutional layer connected sequentially;
the multi-scale jump connection module comprises a first row consisting of three 3×3 convolutional layers and a Relu layer in series, a second row consisting of three 5×5 convolutional layers and the Relu layer in series, and a third row consisting of three 7×7 convolutional layers and the Relu layer in series;
taking outputs of a first 3×3 convolutional layer and the Relu layer of each row as inputs of a second 3×3 convolutional layer and the Relu layer of each row, respectively;
taking outputs of the second 3×3 convolutional layer and the Relu layer of each row as inputs of a third 3×3 convolutional layer and the Relu layer of each row, respectively; and
fusing outputs of the third 3×3 convolutional layer and the Relu layer of each row through a contact module and outputting after fusion.

4. A multi-scale fusion defogging method based on a stacked hourglass network, comprising:
inputting a foggy image into a preset image defogging network; and
outputting a fogless image after the foggy image is processed by the image defogging network;
wherein the image defogging network comprises a 7×7 convolutional layer, a stacked hourglass module, a feature fusion, a multi-scale jump connection module, a 1×1 convolutional layer, a 3×3 convolutional layer, a hierarchical attention distillation module, the 3×3 convolutional layer and the 1×1 convolutional layer connected sequentially;
wherein the hierarchical attention distillation module comprises a channel attention module and a spatial attention module, and
fusing outputs of the channel attention module and the spatial attention module and outputting after fusion;
processing, by the channel attention module, an input feature map F through a global max pool layer in H dimension and a global avgpool layer in W dimension respectively, to obtain two 1×1×C feature maps, wherein the input feature map F is expressed by a formula F=H×W×C, H denotes height, W denotes width, C denotes a number of channels; and
inputting the two 1×1×C feature maps into a two-layer neural network with shared weights for learning inter-channel dependencies; and
summing and fusing features output from a multilayer perceptron (MLP); and
operating by a sigmoid function after fusion to generate a weight M of channels.

5. The multi-scale fusion defogging method according to claim 4, further comprising
processing, by the spatial attention module, an input feature map F through a max pool layer in C dimension and an avgpool layer in C dimension respectively, to obtain two H×W×1 feature maps, wherein the input feature map F is expressed by a formula F=H×W×C, H denotes height, W denotes width, C denotes a number of channels;
splicing the two H×W×1 feature maps based on a channel dimension;
reducing the channel dimension on the spliced feature map by using the 7×7 convolution layer; and
operating by a sigmoid function after fusion to generate a weight M of a spatial dimension.

* * * * *